United States Patent
Steen et al.

(10) Patent No.: US 10,350,518 B2
(45) Date of Patent: Jul. 16, 2019

(54) PROCESSES FOR FILTERING LIQUIDS USING SINGLE PASS TANGENTIAL FLOW FILTRATION SYSTEMS AND TANGENTIAL FLOW FILTRATION SYSTEMS WITH RECIRCULATION OF RETENTATE

(71) Applicant: EMD Millipore Corporation, Burlington, MA (US)

(72) Inventors: Jonathan Steen, Worcester, MA (US); Mikhail Kozlov, Lexington, MA (US); Herbert Lutz, Playa del Rey, CA (US); Joseph Parrella, Westford, MA (US); Elizabeth M. Goodrich, Bedford, MA (US); Bala Raghunath, Bangalore (IN)

(73) Assignee: EMD Millipore Corporation, Burlington, MA (US)

( * ) Notice: Subject to any disclaimer, the term of this patent is extended or adjusted under 35 U.S.C. 154(b) by 590 days.

(21) Appl. No.: 14/839,852

(22) Filed: Aug. 28, 2015

(65) Prior Publication Data

US 2016/0059160 A1 Mar. 3, 2016

Related U.S. Application Data

(60) Provisional application No. 62/043,846, filed on Aug. 29, 2014.

(51) Int. Cl.
*B01D 29/60* (2006.01)
*B01D 29/52* (2006.01)
(Continued)

(52) U.S. Cl.
CPC ........... *B01D 29/908* (2013.01); *B01D 29/52* (2013.01); *B01D 29/603* (2013.01);
(Continued)

(58) Field of Classification Search
None
See application file for complete search history.

(56) References Cited

U.S. PATENT DOCUMENTS 3,540,595 A 11/1970 Edwards
4,222,874 A 9/1980 Connelly
(Continued)

FOREIGN PATENT DOCUMENTS

CN 103429308 12/2013
EP 0 307 047 9/1988
(Continued)

OTHER PUBLICATIONS

Casey et al., "Cadence Single-pass TFF Coupled with Chromatography Steps Enables Continuous Bioprocessing while Reducing Processing Times and Volumes," Retrieved from the internet: URL: www.pall.com/pdfs/Biopharmaceuticals/USD3003_Cadence_SPTFF_ChromSteps_AN.pdf, Retrieved on: Dec. 8, 2015, whole document.
(Continued)

*Primary Examiner* — Ana M Fortuna
(74) *Attorney, Agent, or Firm* — Hamilton, Brook, Smith & Reynolds, P.C.

(57) ABSTRACT

Methods of filtering a liquid feed are disclosed. In one version, the method comprises passing a liquid feed through a single pass tangential flow filtration (SPTFF) system and recovering the retentate and permeate from the system in separate containers without recirculation through the SPTFF system. In another version, the method of filtering a liquid feed, comprises passing a liquid feed through a tangential flow filtration (TFF) system, recovering permeate and a portion of the retentate from the system in separate containers without recirculation through the TFF system, and recirculating the remainder of the retentate through the TFF system at least once. The methods can be performed using an SPTFF or a TFF system that comprises manifold seg- (Continued)

ments to serialize the flow path of the feed and retentate without requiring diverter plates.

22 Claims, 3 Drawing Sheets

(51) Int. Cl.
  *B01D 29/90*  (2006.01)
  *B01D 61/14*  (2006.01)
  *B01D 63/04*  (2006.01)
  *B01D 63/12*  (2006.01)

(52) U.S. Cl.
  CPC ......... *B01D 61/142* (2013.01); *B01D 61/145* (2013.01); *B01D 61/147* (2013.01); *B01D 63/04* (2013.01); *B01D 63/12* (2013.01); *B01D 2313/105* (2013.01); *B01D 2313/125* (2013.01); *B01D 2313/21* (2013.01); *B01D 2313/44* (2013.01); *B01D 2315/10* (2013.01)

(56) References Cited

U.S. PATENT DOCUMENTS

| | | |
|---|---|---|
| 4,756,835 A | 7/1988 | Wilson |
| 4,765,906 A | 8/1988 | Downing et al. |
| 4,956,085 A | 9/1990 | Kopf |
| D325,070 S | 3/1992 | Kopf |
| D327,313 S | 6/1992 | Kopf |
| 5,147,542 A | 9/1992 | Proulx |
| D357,059 S | 4/1995 | Kopf |
| 5,470,468 A | 11/1995 | Colby |
| 5,538,642 A | 7/1996 | Solie |
| 5,599,447 A | 2/1997 | Pearl et al. |
| 5,654,025 A | 8/1997 | Raghunath et al. |
| 5,685,990 A | 11/1997 | Saugmann et al. |
| 6,139,746 A | 10/2000 | Kopf |
| 6,294,090 B1 | 9/2001 | Nussbaumer et al. |
| 6,365,395 B1 | 4/2002 | Chris |
| 6,387,270 B1 | 5/2002 | van Reis |
| 6,596,172 B1 | 7/2003 | Kopf |
| 6,926,833 B2 | 8/2005 | van Reis |
| 7,101,561 B2 | 9/2006 | Maertens et al. |
| 7,384,549 B2 | 6/2008 | de los Reyes et al. |
| 7,531,632 B2 | 5/2009 | Perreault |
| 7,682,511 B2 | 3/2010 | de los Reyes et al. |
| 7,959,805 B2 | 6/2011 | Chisolm et al. |
| 7,967,987 B2 | 6/2011 | de los Reyes et al. |
| D651,280 S | 12/2011 | Okawa et al. |
| D655,780 S | 3/2012 | Honda et al. |
| 8,157,999 B2 | 4/2012 | de los Reyes et al. |
| 8,231,787 B2 | 7/2012 | Mir et al. |
| 8,506,802 B1 * | 8/2013 | de los Reyes ......... B01D 15/22 210/198.2 |
| 8,728,315 B2 | 5/2014 | de los Reyes |
| 8,747,669 B1 | 6/2014 | Bonner et al. |
| D729,897 S | 5/2015 | Ledbetter et al. |
| 9,133,433 B2 | 9/2015 | Vogel et al. |
| D741,983 S | 10/2015 | Mueller et al. |
| D811,519 S | 2/2018 | Natale et al. |
| 2002/0177693 A1 | 11/2002 | Lebing et al. |
| 2003/0066794 A1 | 4/2003 | Diel |
| 2003/0111402 A1 | 6/2003 | Baig et al. |
| 2004/0167320 A1 | 8/2004 | Couto et al. |
| 2005/0184008 A1 | 8/2005 | Schacht |
| 2005/0197496 A1 | 9/2005 | Perreault |
| 2006/0051347 A1 | 3/2006 | Winter |
| 2006/0144788 A1 | 7/2006 | Cath et al. |
| 2007/0138082 A1 * | 6/2007 | Connors, Jr. ......... B01D 63/082 210/321.84 |
| 2007/0173638 A1 | 7/2007 | Buchacher et al. |
| 2007/0246406 A1 * | 10/2007 | Dibel ................. B01D 61/142 210/96.2 |
| 2008/0135500 A1 | 6/2008 | Gagnon et al. |
| 2009/0214522 A1 | 8/2009 | Winter |
| 2009/0266756 A1 | 10/2009 | Fischer-Fruehholz et al. |
| 2010/0111378 A1 | 5/2010 | Kwan |
| 2011/0005984 A1 | 1/2011 | Boettcher et al. |
| 2011/0309018 A1 | 12/2011 | Kopf et al. |
| 2012/0077963 A1 | 3/2012 | Hongo et al. |
| 2012/0122076 A1 | 5/2012 | Lau et al. |
| 2012/0166332 A1 | 6/2012 | Naaman |
| 2012/0264948 A1 | 10/2012 | Hilbert et al. |
| 2012/0298578 A1 | 11/2012 | Herrington et al. |
| 2012/0316323 A1 | 12/2012 | Nardini et al. |
| 2013/0037486 A1 | 2/2013 | Sayer et al. |
| 2013/0146531 A1 | 6/2013 | Tayalia et al. |
| 2013/0334128 A1 | 12/2013 | Takagi et al. |
| 2014/0231331 A1 | 8/2014 | de los Reyes et al. |
| 2014/0251896 A1 | 9/2014 | Hirozawa et al. |
| 2015/0360180 A1 | 12/2015 | Lutz et al. |
| 2015/0361129 A1 | 12/2015 | Natarajan et al. |
| 2015/0375173 A1 | 12/2015 | Steen |
| 2016/0059159 A1 | 3/2016 | Steen et al. |

FOREIGN PATENT DOCUMENTS

| | | |
|---|---|---|
| EP | 613 724 | 3/1989 |
| EP | 1 029 583 | 8/2000 |
| EP | 1 707 254 | 3/2006 |
| EP | 1 974 801 A2 | 1/2008 |
| EP | 2 067 522 | 5/2008 |
| EP | 1 944 076 A1 | 7/2008 |
| EP | 2 119 492 | 11/2009 |
| EP | 2 682 168 | 1/2014 |
| EP | 2 703 066 | 3/2014 |
| EP | 2 735 357 A1 | 5/2014 |
| JP | 2000288541 A | 10/2000 |
| JP | 2001252543 | 9/2001 |
| JP | 2008023415 | 2/2008 |
| JP | 2013240765 | 2/2008 |
| JP | 2009198915 | 8/2009 |
| JP | 2010-053154 | 3/2010 |
| WO | WO 2000/048703 | 8/2000 |
| WO | WO 2005/054287 | 6/2005 |
| WO | WO 2007/076496 | 7/2007 |
| WO | WO 2007/076497 | 7/2007 |
| WO | WO 2009/064797 | 5/2009 |
| WO | WO 2011/094236 | 8/2011 |
| WO | WO 2012/039675 A1 | 3/2012 |
| WO | 2013106337 A1 | 7/2013 |
| WO | WO 2013/125505 | 8/2013 |
| WO | WO 2014/067898 | 5/2014 |
| WO | 2015133972 A1 | 9/2015 |
| WO | WO 2015/195452 | 12/2015 |
| WO | WO 2015/195453 | 12/2015 |
| WO | WO 2015/200691 A1 | 12/2015 |
| WO | WO2016/033546 | 3/2016 |
| WO | WO2016/033553 | 3/2016 |

OTHER PUBLICATIONS

Casey et al., "Protein concentration with single-pass tangential flow filtration (SPTFF)," Journal of Membrane Science, 384(1): 82-88 (Sep. 2011).

Casey, C. et al., "CadenceTM Single-pass TFF Coupled with Chromatography Steps Enables Continuous BioProcessing while Reducing Processing Times and Volumes", Application Note (Jan. 2015).

Chinese Search Report for CN Application No. 201580000755.4, "Processes for Filtering Liquids Using Single Pass Tangential Flow Filtration Systems and Tangential Flow Filtration Systems With Recirculation of Retentate", dated Oct. 27, 2016.

Choo, K.-H. and C.-H. Lee, "Membrane fouling mechanisms in the membrane-coupled anaerobic bioreactor," Water Research, 30(8): 1771-1780 (Aug. 1996).

Dizon-Maspat, J. et al., "Single pass tangential flow filtration to debottleneck downstream processing for therapeutic antibody production," Biotechnology and Bioengineering, 109(4): 962-970 (Apr. 2012).

(56) References Cited

OTHER PUBLICATIONS

Extended European Search Report for EP Application No. 15172144.6, titled: Single-Pass Filtration Systems and Processes, Dated: Nov. 20, 2015.
International Search Report and Written Opinion for International Application No. PCT/US2015/037780, "Compact Spiral-Wound Filter Elements, Modules and Systems", dated Sep. 7, 2015.
International Search Report and Written Opinion for Int'l Application No. PCT/US2015/035251, titled: Methods for Increasing The Capacity of Flow-Through Processes, dated Dec. 18, 2015.
International Search Report and Written Opinion for Int'l Application No. PCT/US2015/035250, titled: Single-Pass Filtration Systems and Processes, dated Dec. 14, 2015.
International Search Report and Written Opinion for Int'l Application No. PCT/US2015/047574, titled: Single Pass Tangential Flow Filtration Systems and Tangential Flow Filtration Systems With Recirculation of Retentate, dated Dec. 7, 2015.
International Search Report and Written Opinion for Int'l Application No. PCT/US2015/047585, titled: Processes for Filtering Liquids Using Single Pass Tangential Flow Filtration Systems and Tangential Flow Filtration Systems With Recirculation of Retentate, dated Dec. 7, 2015.
Kwang-Ho, C. et al., "Membrane fouling mechanisms in the membrane-coupled anaerobic bioreactor," Water Research, 30(8): 1771-1780 (Aug. 1996).
Liu, H.F., et al., "Recovery and purification process development for monoclonal antibody production," mAbs 2(5):480-499 (Sep. 1, 2010).
Maintenance Procedures PelliconTM and PelliconTM-2 Cassette Filters (Jul. 1998).
Middlewood, P.G. et al., "Extraction of amaranth starch from an aqueous medium using microfiltration: Membrane fouling and cleaning," Journal of Membrane Science, vol. 411-412, pp. 22-29 (Apr. 2012).
Partial European Search Report for EP Application No. 15172146.1, titled: "Compact Spiral-Wound Filter Elements, Modules and Systems", Dated: Nov. 6, 2015.
Rathore, A.S. et al., "Recent Developments in Membrane-Based Separations in Biotechnology Processes: Review," Preparative Biochemistry and Biotechnology, 41(4): 398-421 (Oct. 2011).
Steen et al., "Single Pass Tangential Flow Filtration", ACS mtg. poster, Anaheim, CA Mar. 2011.
Teske et al., "Inline Ultrafiltration," Biotechnol. Prog., 26(4): 1068-1072 (Mar. 2010).
van Reis, R. et al., "Linear Scale Ultrafiltration," Biotechnology and Bioengineering, 55(5): 737-746 (Sep. 1997).
Pall Corporation Brochure "Cadence™ Single-Pass Tangential Flow Filtration Modules and Systems", (2014).
Zou, Y., et al., "New Technologies for high concentration protein ultrafiltration: High Viscosity TFF Cassettes and Single-Pass TFF", Oct. 2014, EMD Millipore, 1 pg.
Chinese Search Report for CN Application No. 201580000755.4, "Single Pass Tangential Flow Filtration Systems and Tangential Flow Filtration Systems With Recirculation of Retentate", dated Mar. 24, 2017.
Internet blog, Tangential Flow Filtration http://blog.naver.com/amiconls/23855658 (Apr. 26, 2006).
Notification Concerning Transmittal of International Preliminary Report on Patentability for International Application No. PCT/US2015/047574, "Single Pass Tangential Flow Filtration Systems and Tangential Flow Filtration Systems With Recirculation of Retentate", dated Mar. 9, 2017.
Notification Concerning Transmittal of International Preliminary Report on Patentability for International Application No. PCT/US2015/047585, "Processes for Filtering Liquids Using Single Pass Tangential Flow Filtration Systems and Tangential Flow Filtration Systems With Recirculation of Retentate", dated Mar. 9, 2017.
Notification Concerning Transmittal of International Preliminary Report on Patentability for International Application No. PCT/US2015/035250, "Single-Pass Filtration Systems and Processes", dated Dec. 29, 2016.
Notification Concerning Transmittal of International Preliminary Report on Patentability for International Application No. PCT/US2015/035251, "Methods for Increasing The Capacity of Flow-Through Processes", dated Dec. 29, 2016.
Notification Concerning Transmittal of International Preliminary Report on Patentability for International Application No. PCT/US2015/037780, "Compact Spiral-Wound Filter Elements, Modules and Systems", dated Jan. 5, 2017.
Schwartz, L., "Diafiltration for Desalting or Buffer Exchange," BioProcess International, pp. 43-49 (2003).
Final Office Action dated Nov. 24, 2017 for U.S. Appl. No. 14/839,779, "Single Pass Tangential Flow Filtration Systems and Tangential Flow Filtration Systems With Recirculation of Retentate".
Non-Final Office Action dated Apr. 2, 2018 for U.S. Appl. No. 14/839,779, "Single Pass Tangential Flow Filtration Systems and Tangential Flow Filtration Systems With Recirculation of Retentate".
Non-Final Office Action dated Feb. 17, 2017 for U.S. Appl. No. 14/736,646, "Single-Pass Filtration Systems and Processes".
Singapore Search Report and Written Opinion for SG Application No. 10201504670R, "Single-Pass Filtration Systems and Processes", dated Nov. 22, 2017.
Final Office Action dated Sep. 7, 2017 for U.S. Appl. No. 14/736,646, "Single-Pass Filtration Systems and Processes".
Chinese Search Report for CN Application No. 201510335030.2, "Single-Pass Filtration Systems and Processes", dated Jun. 26, 2017.
Non-Final Office Action dated Mar. 15, 2018 for U.S. Appl. No. 14/736,646, "Single-Pass Filtration Systems and Processes".
Non-Final Office Action for U.S. Appl. No. 14/839,779, "Single Pass Tangential Flow Filtration Systems and Tangential Flow Filtration Systems With Recirculation of Retentate", dated Jul. 20, 2017.
Notice of Allowance dated Oct. 23, 2018 for U.S. Appl. No. 14/736,646, "Single-Pass Filtration Systems and Processes".

* cited by examiner

PROCESSES FOR FILTERING LIQUIDS USING SINGLE PASS TANGENTIAL FLOW FILTRATION SYSTEMS AND TANGENTIAL FLOW FILTRATION SYSTEMS WITH RECIRCULATION OF RETENTATE

RELATED APPLICATION(S)

This application claims the benefit of U.S. Provisional Application No. 62/043,846, filed on Aug. 29, 2014. The entire teachings of the above application is incorporated herein by reference.

BACKGROUND OF THE INVENTION

Tangential flow filtration (TFF) is a separation process that uses membranes to separate components in a liquid solution or suspension on the basis of size, molecular weight or other differences. Serializing the flow path of the liquid feed from one filtration module to the next in the TFF system can improve conversion by increasing fluid residence time in membrane modules. Traditional TFF processes typically rely on added TFF system components, such as diverter plates, to serialize the flow path of the liquid feed through the TFF system. Diverter plates, however, add cost and certain complexity to the system, and require additional operator training.

Accordingly, there is a need for improved TFF systems and processes that do not require diverter plates, or custom module assemblies, for effective serial processing of liquids. In addition, there is a present need for TFF systems and processes that include diafiltration using a serialized flow path to permit continuous flow and potentially more efficient bioprocessing at an industrial scale.

SUMMARY OF THE INVENTION

In one embodiment, the present invention relates to a method of filtering a liquid feed, comprising passing a liquid feed in a single pass mode through a single pass tangential flow filtration (SPTFF) system and recovering the retentate and permeate from the system in separate containers without recirculation through the SPTFF system, thereby filtering the liquid feed.

In one aspect of this embodiment, the SPTFF system comprises a plurality of filtration modules that are fluidly connected. Each of the filtration modules comprises a manifold segment that includes a first manifold for receiving and carrying the feed into the filtration module, a second manifold for receiving and carrying retentate out of the filtration module, and a third manifold for receiving and carrying permeate through the filtration module. The filtration modules are fluidly connected through the manifold segments to provide a serial flow path between filtration modules, by coupling of the first manifold in a manifold segment to the second manifold of a manifold segment in an adjacent module, such that the retentate of one module serves as the feed for the next module. The manifold segment in each module is also fluidly connected to one or more TFF capsules that are positioned, or loaded, on one or both faces of the manifold segment. In addition, the SPTFF system comprises a feed inlet on the first module in the system and a retentate outlet on the last module in the system.

In another aspect of this embodiment, the SPTFF system consists of one filtration module. The filtration module comprises a feed inlet, a retentate outlet, a manifold segment that comprises a first manifold for receiving and carrying the feed into the filtration module, a second manifold for receiving and carrying retentate out of the filtration module, and a third manifold for receiving and carrying permeate through the filtration module, wherein the flow path through the manifold segment is serial, and one or more TFF capsules that are positioned on one or both faces of, and are fluidly connected to, the manifold segment, wherein the liquid flow path is parallel through the capsules.

In another embodiment, the invention relates to a method of filtering a liquid feed, comprising passing a liquid feed through a tangential flow filtration (TFF) system, recovering permeate and a portion of the retentate from the system in separate containers without recirculation through the TFF system, and recirculating the remainder of the retentate through the TFF system at least once, thereby filtering the liquid feed.

In one aspect of this embodiment, the TFF system comprises a plurality of filtration modules that are fluidly connected. Each of the filtration modules comprises a manifold segment that includes a first manifold for receiving and carrying the feed into the filtration module, a second manifold for receiving and carrying retentate out of the filtration module, and a third manifold for receiving and carrying permeate through the filtration module. The filtration modules are fluidly connected through the manifold segments to provide a serial flow path between filtration modules, by coupling of the first manifold in a manifold segment to the second manifold of a manifold segment in an adjacent module, such that the retentate of one module serves as the feed for the next module. The manifold segment in each module is also fluidly connected to a plurality of TFF capsules that are positioned on one or both faces of the manifold segment. In addition, the TFF system comprises a feed inlet on the first module in the system, a retentate outlet on the last module in the system, a recirculation loop (e.g., a pump) for recirculating retentate through all or part of the system, and at least one conduit for recirculating retentate.

In another aspect of this embodiment, the TFF system consists of one filtration module. The filtration module comprises a feed inlet, a retentate outlet, a recirculation loop (e.g., a pump) for recirculating retentate through all or part of the system, at least one conduit for recirculating retentate, a manifold segment that comprises a first manifold for receiving and carrying the feed into the filtration module, a second manifold for receiving and carrying retentate out of the filtration module, and a third manifold for receiving and carrying permeate through the filtration module, wherein the flow path through the manifold segment is serial, and a plurality of TFF capsules that are positioned on one or both faces of, and are fluidly connected to, the manifold segment, wherein the liquid flow path is parallel through the capsules.

Figure 1:
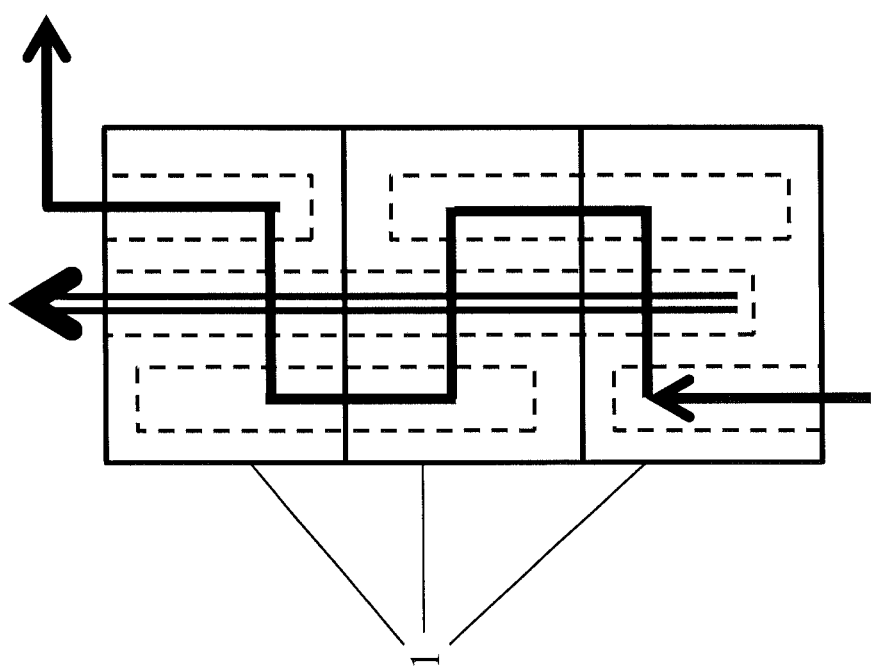
FIG. 1 is a diagram showing three vertically-stacked manifold segments 1 having a manifold arrangement that facilitates a serial flow path for feed and retentate.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Definitions

Unless defined otherwise, all technical and scientific terms used herein have the same meaning as commonly understood by one of ordinary skill in the art to which this invention pertains.

"SPTFF assembly," "SPTFF system" and "SPTFF apparatus" are used interchangeably herein to refer to a single pass tangential flow filtration system that is configured for operation in a single-pass mode, where the fluid passes once through the system.

"TFF assembly," "TFF system" and "TFF apparatus" are used interchangeably herein to refer to a tangential flow filtration system that is configured for operation a recirculation mode where at least a portion of the retentate is returned to the system as feed.

The terms "feed," "feed sample" and "feed stream" refer to the solution that is delivered (e.g., continuously, as a batch) to a filtration module to be filtered. The feed that is delivered to a filtration module for filtration can be, for example, feed from a feed container (e.g., vessel, tank) external to the system, or retentate from a preceding filtration module in the same system (e.g., in SPTFF and TFF systems operated in serial processing mode).

The term "filtration" generally refers to the act of separating the feed sample into two streams, a permeate and a retentate, using membranes.

The terms "permeate" and "filtrate" refer to that portion of the feed that has permeated through the membrane.

The term "retentate" refers to the portion of the solution that has been retained by the membrane, and the retentate is the stream enriched in a retained species.

"Feed line" or "feed channel" refers to a conduit for conveying a feed from a feed source (e.g., a feed container) to one or more processing units in a filtration assembly (e.g., a TFF system).

"Retentate line" or "retentate channel" refers to a conduit in a filtration assembly for carrying retentate.

"Permeate line" or "permeate channel" refers to a conduit in a filtration assembly for carrying permeate.

The expression "flow path" refers to a channel supporting the flow of a liquid (e.g., feed, retentate, permeate) through all or part of an SPTFF or a TFF system. Thus, an SPTFF and a TFF system can have multiple flow paths, including a flow path through the entire system from the feed inlet to the retentate outlet, a flow path within a filtration module (e.g., a flow path through TFF capsules and/or a manifold segment in a filtration module) and a flow path between two or more adjacent filtration modules (e.g., a flow path between manifold segments in adjacent filtration modules). The flow path can have any topology which supports tangential flow (e.g., straight, coiled, arranged in zigzag fashion). The flow path can be parallel or serial. A flow path can also refer to a path resulting in a single pass through an SPTFF system or a path for recirculating retentate through a TFF system. Furthermore, a flow path can be open, as in an example of channels formed by hollow fiber membranes, or have one or more flow obstructions, as in the case, for example, of rectangular channels formed by flat-sheet membranes spaced apart by woven or non-woven spacers.

A "filtration module" refers to a unit in an SPTFF or a TFF system comprising a manifold segment and one or more TFF capsules.

A "manifold segment" refers to a block having a plurality of manifolds, including a manifold for carrying a feed, a manifold for carrying a retentate and a manifold for carrying a permeate.

A "TFF cartridge" or "TFF capsule" refers to a spiral wound element or hollow fiber filter bundle in a self-contained roughly cylindrical housing containing a filtration membrane and separate feed/retentate and permeate flow channels suitable for SPTFF and TFF processes.

"Filtration membrane" refers to a selectively permeable membrane for separating a feed into a permeate stream and a retentate stream using an SPTFF or a TFF process. Filtration membranes include, but are not limited to, ultrafiltration (UF) membranes, microfiltration (MF) membranes, reverse osmosis (RO) membranes and nanofiltration (NF) membranes.

The terms "ultrafiltration membrane" and "UF membrane" are used herein to refer to a membrane that has pore sizes in the range of between about 1 nanometer to about 100 nanometers.

The term "microfiltration membranes" and "MF membranes" are used herein to refer to membranes that have pore sizes in the range between about 0.1 micrometers to about 10 micrometers.

The term "plurality," when used herein to describe processing units, refers to two or more processing units.

"Fluidly connected" refers to two or more components of an SPTFF or a TFF system (e.g., two or more manifold segments, two or more TFF capsules, a manifold segment and one or more TFF capsules), that are connected by one or more conduits (e.g., a feed channel, a retentate channel, a permeate channel) such that a liquid can flow from one component to the other.

"Product" refers to a target compound in a feed. Typically, a product will be a biomolecule (e.g., protein) of interest, such as a monoclonal antibody (mAb).

"Processing" refers to the act of filtering (e.g., by SPTFF or TFF) a feed containing a product of interest and subsequently recovering the product in a concentrated form. The concentrated product can be recovered from the filtration system (e.g., an SPTFF or a TFF system) in either the retentate stream or permeate stream depending on the product's size and the pore size of the filtration membrane.

The expressions "parallel processing", "processing in parallel", "parallel operation" and "operation in parallel" refer to distributing a liquid in an SPTFF or a TFF system to two or more filtration units (e.g., filtration modules, TFF capsules) in the assembly concurrently, or in rapid succession, for subsequent tangential flow filtration.

The expressions "serial processing", "processing in series", "serial operation" and "operation in series" refer to distributing a liquid in an SPTFF or a TFF system to one filtration unit (e.g., filtration module, TFF capsule) at a time, such that the retentate flow of a preceding unit serves as the feed flow for a subsequent, adjacent unit.

The expressions "conversion" and "conversion per pass" are used herein to denote the fraction of the feed volume that permeates through the membrane in a pass through the flow channels, expressed as a percentage of the feed stream volume.

The term "residence time" refers to holdup volume on the feed side of the membrane divided by flow rate.

The term "single-pass TFF mode" refers to operating conditions for an SPTFF or a TFF system under which the retentate is not recirculated through the system.

Methods of the Invention

In contrast, the methods described herein, also referred to as the "methods of the invention" can be performed using an SPTFF or a TFF system that comprises manifold segments to serialize the flow path of the feed and retentate without requiring diverter plates. For example, the diagram in FIG. 1 depicts three vertically-stacked manifold segments 1 having a manifold arrangement that facilitates a serial flow path for feed and retentate. Manifolds within the segments are depicted using dashed lines. The flow path for feed and retentate is shown using single-line arrows and the permeate flow path is shown with a double-line arrow. The flow path for the feed and retentate is serialized, as the retentate of the preceding, lower module serves as the feed for the following module above. The middle manifold is used for permeate.

Methods of the Invention Using Single-Pass Tangential Flow Filtration (SPTFF)

In one embodiment, the invention relates to a method of filtering a liquid feed comprising passing a liquid feed through a single pass tangential flow filtration (SPTFF) system and recovering the retentate and permeate from the system in separate containers.

The liquid feed can be any liquid (e.g., a biological liquid) that contains particles (e.g., viral particles, host cell proteins) to be filtered. For example, the liquid feed can contain a target molecule of interest (e.g., a target protein, such as a recombinant protein) and one or more impurities (e.g., non-target proteins). Typically, the liquid feed is obtained from a source of the target molecule (e.g., a hybridoma or other host cell expressing a monoclonal antibody (MAb)). In a particular embodiment, the target molecule in the liquid feed is a MAb and the non-target molecules are host cell proteins (HCPs) (e.g., proteins from host hybridoma cells). Non-target proteins are generally a heterogeneous mixture of proteins of varying sizes, hydrophobicities and charge densities. In another embodiment, the liquid feed contains one or more viruses (e.g., for virus filtration processes). In yet another embodiment, the liquid feed includes plasma products.

An SPTFF system allows direct flow-through concentration of a product (e.g., target protein) in the absence of recirculation, which reduces overall system size through elimination of mechanical components and permits continuous operation at high conversion levels. Thus, SPTFF systems and processes provide several advantages over traditional TFF systems and processes.

In general, SPTFF systems that are useful for the present invention can be assembled and operated using standard, existing TFF system components that are well known and are commercially available. Standard TFF system components include, for example, TFF capsules comprising filtration membranes, capsule holders, conduits (e.g., tubing, piping) for feed, retentate and permeate, a housing or enclosure, valves, gaskets, a pump module (e.g., pump module comprising a pump housing, diaphragm and check valve) one or more reservoirs (e.g., process containers for feed, retentate and permeate) and a pressure gauge.

In accordance with the invention, the liquid feed is passed (e.g., pumped) through an SPTFF system that comprises at least one filtration module. In general, each filtration module comprises a manifold segment that includes a first manifold for receiving and carrying the feed into the filtration module, a second manifold for receiving and carrying retentate out of the filtration module, and a third manifold for receiving and carrying permeate through the filtration module. The manifold segment is fluidly connected to one or more TFF capsules that are positioned on one or both faces of the manifold segment. When the SPTFF system contains only one filtration module, that module comprises both a feed inlet and retentate outlet, whereas, in systems comprising a plurality of filtration modules, the feed inlet is on the first filtration module in the system (e.g., the module that first receives the feed directly through a channel comprising the feed pump) and the retentate outlet is on the final, or last, filtration module in the system.

In a particular embodiment, the SPTFF system contains only one filtration module. In another embodiment, the SPTFF system contains a plurality of filtration modules.

Each manifold segment has a manifold structure, or arrangement, that permits the segment to be fluidly connected to manifold segments in adjacent filtration modules. The manifold segments are connected in a manner that promotes a serial flow path from manifold segment to manifold segment (see, e.g., FIG. 1). For example, adjacent manifold segments are arranged such that the first manifold in each manifold segment is connected to the second manifold of an adjacent manifold segment. As a result of this arrangement, the retentate of one module (which exits the module through the second manifold in the manifold segment) serves as the feed for the next module (which is received in the first manifold of the manifold segment). A third manifold in the manifold segment provides a separate path for discharging the permeate from the filtration modules.

The manifolds in the manifold segments in an SPTFF system can have identical diameters, or different diameters, from manifold segment to manifold segment. For example, the diameter of the manifolds can be progressively smaller from manifold segment to manifold segment. Decreasing manifold diameter through series helps maintain fluid velocity for flush and cleaning through the different sections as fluid is lost to the permeate in each section. This may also aid in removing air, increasing maximum concentration factor, and increasing product recovery and/or reducing product dilution. In particular embodiments, each manifold segment has manifolds having the same diameter from one end to the next (e.g., the manifolds are not tapered). In other embodiments, the manifolds can be tapered.

In one embodiment, parallel flow between adjacent manifold segments is prevented using seals or valves (e.g., sanitary valves) to facilitate a serial flow path between modules. For example, seals or valves can be positioned in the manifolds that carry feed and retentate to block liquid from flowing in a parallel fashion into adjacent manifold segments. The use of seals or valves to prevent parallel flow is particularly desirable when the manifold segments are fully bored, such that the first, second and third manifolds each extend completely through the manifold segment.

Suitable seals (e.g., mechanical seals) for placement in manifolds include, but are not limited to, rings (e.g., o-rings, metal rings), molding, packing, sealants and gaskets. Preferably, the seal is a gasket, such as, for example, a gasket that closes off an opening or a gasket having a length sufficient to closes off any dead volume between the opening and a first passage in a manifold. Preferably, the gasket is flexible and sanitary (e.g., a gasket that is non-shedding, cleanable, sanitizable, and has low extractables). The gasket can include an elastomeric material or metal (e.g., a metal foil). An exemplary gasket is part# A84MP-G from Newman Gasket Co., Lebanon, Ohio.

The use of valves instead of seals provides greater operational flexibility by permitting parallel flow between manifold segments when the valves are open, and serial flow when the valves are closed. Suitable valves for use in manifolds include, for example, pinch valves (e.g., diaphragm valve). Preferably, the valve is low shear and sanitary (e.g., compatible, non-toxic, sanitizable, non-shedding). As used herein, a "sanitary valve" is a valve that can maintain a sterile connection regardless of whether the valve is open or closed. Typically, a sanitary valve will be compatible, non-toxic, sanitizable and non-shedding.

In another embodiment, parallel flow between adjacent manifold segments can be prevented by the use of manifold segments that do not have fully-bored manifolds for carrying feed and retentate. For example, manifold segments with first and second manifolds that do not extend through the entire manifold segment can be used to prevent parallel flow of feed and retentate, respectively, between adjacent manifold segments to facilitate a serial flow path between modules. Typically, such manifold segments will contain a separate third manifold for carrying permeate that does extend the entire length of the segment for carrying permeate to adjacent segments.

Examples of manifold segments that can be used in the processes described herein are disclosed in U.S. Pat. No. 5,147,542, the contents of which are incorporated herein by reference.

The manifold segment in each filtration module is also fluidly connected to one or more TFF capsules (e.g., one or more separate TFF capsules, one or more TFF capsules packaged in a single capsule holder). For example, the manifold segment can be fluidly connected to TFF capsules through flow channels that connect the feed, permeate and retentate manifolds in the manifold segment to each TFF capsule on the sides of the manifold segment (see, e.g., FIGS. 2B and 2C). Typically, the feed that enters a manifold segment is distributed in a parallel fashion to each of the capsules positioned on the sides of the manifold segment (see, e.g., FIG. 2B).

Figure 2:
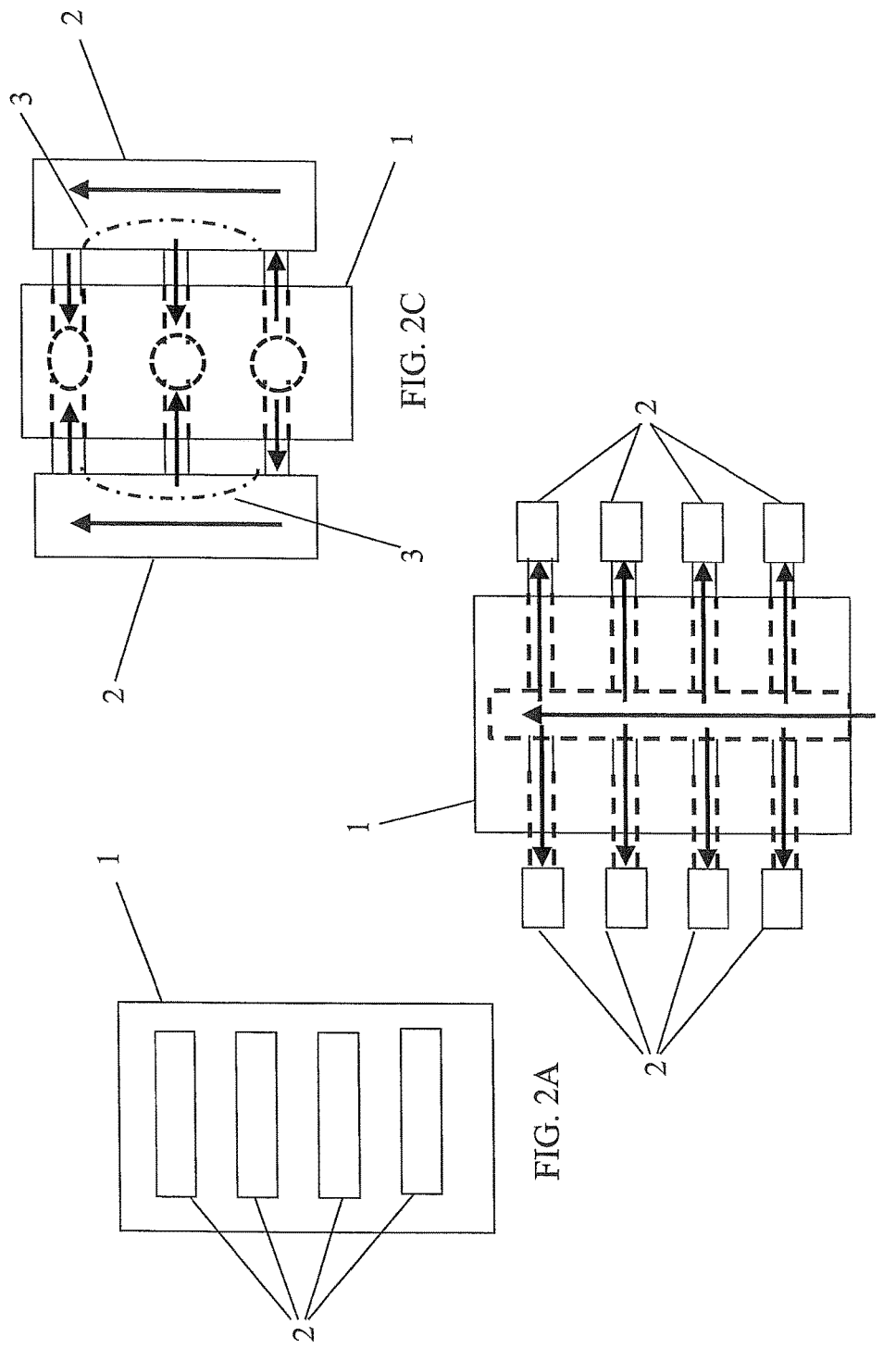
FIG. 2A is a diagram depicting a side view of a single manifold segment 1 that is loaded with four capsules 2 on each side of the segment.
FIG. 2B is a diagram depicting an end view of the single manifold segment 1 depicted in FIG. 2A, showing the four capsules 2 on each side of the segment.
FIG. 2C is a diagram depicting a top view of the single manifold segment 1 depicted in FIGS. 2A and 2B, showing only the uppermost capsule 2 on each side of the segment.

The diagrams in FIGS. 2A, 2B and 2C represent side, end and top views, respectively, of a filtration module comprising a single manifold segment 1 and eight TFF capsules 2, with four capsules on each side of the manifold segment. The diagram in FIG. 2A depicts a side view of the manifold segment 1, showing the positions of four capsules 2 on the side that is shown.

The diagram in FIG. 2B depicts an end view of the same manifold segment 1, showing four capsules 2 on each side of the segment. The feed manifold is depicted using dashed lines. Arrows show the flow path of the feed through the manifold segment. As can be seen in the diagram, the feed is distributed in a parallel fashion to the eight capsules 2.

The diagram in FIG. 2C depicts a top view of the manifold segment 1 depicted in FIGS. 2A and 2B, showing only the uppermost capsule 2 on each side of the segment. Manifolds within the manifold segment are represented by dashed lines. The circles delineated by dashed lines represent the feed (bottom), permeate (middle) and retentate (top) manifolds in the manifold segment. Horizontal arrows show the flow path out of the feed manifold in the manifold segment and into the capsules on each side, and from the capsules back into the permeate and retentate manifolds in the manifold segment. Vertical arrows show the flow path through the capsules 2 and along the filtration membrane 3 in each capsule.

The TFF capsules can be located on one or both faces of the manifold segment. Typically, each filtration module can accommodate up to about 10 $m^2$ of filtration membrane area on each face of the manifold segment for a total of about 20 $m^2$ of area per filtration module. Thus, in some embodiments, the total filtration area of a filtration module is about 20 $m^2$ or less, such as, for example, about 10 $m^2$, about 5 $m^2$, about 2 $m^2$, about 1 $m^2$, about 0.5 $m^2$ or about 0.1 $m^2$ of filtration membrane area. Accordingly, the number of capsules that can be positioned on each side of the manifold segment depends on the membrane area of the particular capsule. Preferably, the filtration modules in an SPTFF system each contain the same number and arrangement of TFF capsules.

In one embodiment, TFF capsules (e.g., about 1, 2, 3, 4, 5, 6, 7, 8, 9, 10 or more TFF capsules) are located on both faces of the manifold segment. In another embodiment, TFF capsules (e.g., about 1, 2, 3, 4, 5, 6, 7, 8, 9, 10 or more TFF capsules) are located on only one face of the manifold segment. When TFF capsules are located on both faces of a manifold segment, the number of TFF capsules on each face of the manifold segment can differ or be the same. Preferably, the total number of TFF capsules on each face of the manifold segment is identical. Preferably, each face of the manifold segment has 1, 2, 3, or 4 capsules.

Exemplary TFF capsules that are useful for the methods described herein include, but are not limited to, TFF capsules supplied by EMD Millipore Corporation (Billerica, Mass.), such as, for example, Prep/Scale® Spiral-Wound Ultrafiltration Modules, Amicon® S40 spiral—wound filters, and Helicon SS50 spiral-wound ultrafiltration membrane cartridges. Other spiral filters that are suitable for the methods described herein include, for example, Ultrafiltration Spiral Membranes available from Alfa Laval AB (Lund, Sweden), including, for example, UFX-pHt Series spiral elements with polysulphone membrane. Other examples of suitable capsules and cartridges for use in the methods described herein include, but are not limited to, Process Scale Ultrafiltration Cartridge (UFP-750-E-55A) from GE Healthcare, the BioProducer 24 Green SU XXX 10 PRO 24 S3 from WaterSep Technology Corporation (Marlborough, Mass.), the hollow fiber KrosFlo® modules from Spectrum Labs Inc. (Rancho Dominguez, Calif.), the Sanitary Ultrafiltration Spiral-Wound Element: VT (PES 3 kDa) by Synder Filtration, Inc. (Vacaville, Calif.), and the ROMICON™ 6" hollow fiber cartridge by Koch Membrane Systems, Inc. (Wilmington, Mass.).

Preferably, the filtration modules in the SPTFF system are stacked (e.g., in a vertical stack) to form levels, wherein each level comprises a single filtration module (see, e.g., FIG. 1). For example, the system can include about 2, 3, 4, 5 or more stacked filtration modules.

The SPTFF systems used in the methods described herein also typically include a feed inlet and retentate outlet. In general, the feed inlet is positioned on the first filtration module in the SPTFF system, and is connected on one end to a conduit (e.g., pipe, tube) that is connected to the feed tank and is connected on the other end to the first manifold in the manifold segment in the first module to receive feed into the system. The retentate outlet is typically positioned on the last, or final, filtration module in the SPTFF system, and is connected on one end to the second manifold in the manifold segment in the last module and is connected on the other end to a conduit (e.g., pipe, channel) that is connected to a retentate container.

SPTFF systems useful for performing the methods described herein can further contain one or more additional components useful for performing SPTFF processes including, but not limited to, the following, examples of which are known in the art: one or more sampling ports, a T-line (e.g., for in-line buffer addition), a pressure sensor, a diaphragm for a pressure sensor, a valve sensor to indicate whether any valves in the system are open or closed, and a flow meter. In a particular embodiment, the SPTFF system includes a sampling port (e.g., sanitary sampling port) at one or more locations in the system. For example, sampling ports can be included at the end of the retentate line, the permeate line, or both. Typically, the sampling port will be located on the manifold segment in a filtration module. In one embodiment, the SPTFF system lacks diverter plates.

In some embodiments, one or more components of the SPTFF system can be disposable. Disposable TFF system components are well known and are available commercially. The disposable components are typically made from disposable materials (e.g., plastic, rubber, metal), preferably plastic. Exemplary disposable components for SPTFF and TFF assemblies include, but are not limited to, components of Flexware® assemblies for Mobius® FlexReady Solution for TFF (EMD Millipore Corporation, Billerica, Mass.).

Methods of the Invention Using TFF Systems with Recirculation of the Retentate

In contrast to SPTFF systems of the invention where the liquid feed passes once through the system, the TFF systems of the invention operate by recirculating at least a portion of the retentate back to feed. Accordingly, an embodiment of the invention relates to a method of filtering a liquid feed, comprising passing a liquid feed through a tangential flow filtration (TFF) system, recovering permeate and a portion of the retentate from the system in separate containers without recirculation through the TFF system, and recirculating the remainder of the retentate through the TFF system at least once. Retentate is recirculated during operation of the entire filtration process or at certain times during operation of the filtration process. For example, recirculating all or a portion of the retentate during start up provides a method by which to ensure that system has reached equilibrium and the retentate has achieved the desired concentration prior to collecting it into the product vessel. It also provides a convenient way to respond to system upsets during processing to provide a more robust process. The fraction of retentate that is recirculated can be adjusted via modulation of the pump or control valve as a way to tune the system in order to assure consistent retentate concentration and/or consistent retentate flow rate to the product collection vessel every run even if feedstock protein concentration, new membrane permeability, membrane fouling, membrane permeability, or membrane mass transfer or pressure drop varies from batch to batch. This strategy has particular benefits in the context of continuous processing where the success of subsequent operations relies on the output of a previous operation. Recirculation of retentate can improve cleaning effectiveness through increased cross flow velocity and reduce cleaning solution through recirculation.

The TFF systems employed in the TFF methods of the invention involving recirculation additionally include a recirculation loop or at least one pump or control valve for recirculating retentate through all or part of the system and at least one conduit for recirculating (e.g., carrying) retentate.

Typically, at least about 50% of the retentate is collected after a single pass, while the remainder of the retentate is recirculated. Preferably, about 10% or less (e.g., about 0.5%, about 1%, about 2%, about 5%, about 10%) of the retentate is recirculated after the first pass through the TFF system.

The amount of retentate that is recirculated can be controlled using, for example, a pump or a valve. A flow meter can be used to provide a process value for the pump or valve to control the amount of retentate that is recirculated. Preferably, the valve or pump and/or flow meter is/are positioned on the retentate outlet or flow line carrying retentate out of the system to the retentate receptacle.

The retentate that is being recirculated can be returned to any upstream location in or before the TFF system. In one embodiment, the retentate is recirculated to the feed tank. In another embodiment, the retentate is recirculated to the feed line near the feed pump before the feed inlet on the TFF system.

Figure 3:
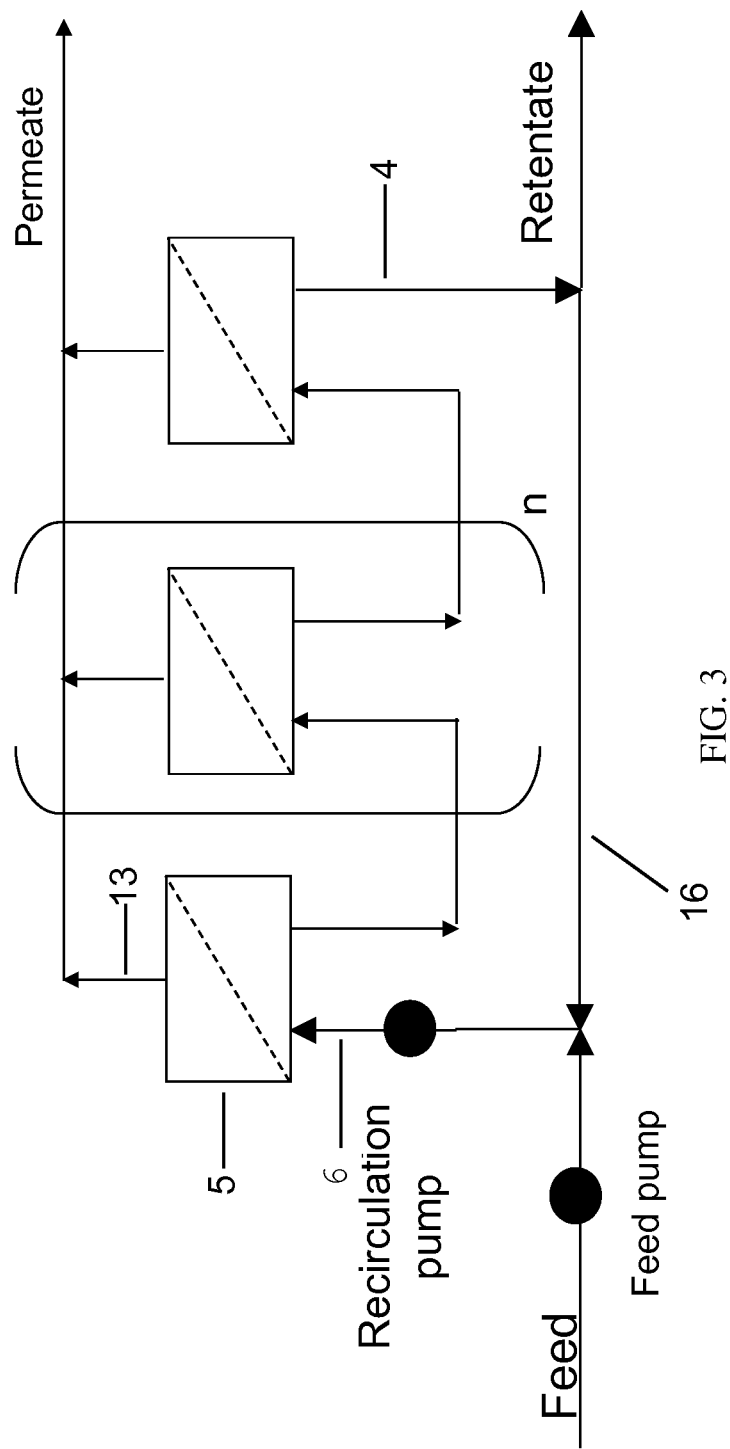
FIG. 3 is an example TFF system configured for recirculation of at least a portion of the retentate; n represents the number of filter modules (n=0 to 8).

An example TFF system configured for recirculation of the retentate is shown in FIG. 3, where the number of filtration modules 5 arranged in series (see also FIG. 1 for an example configuration) can differ depending upon system design. Feed enters the system at the left through a feed inlet 6 and a portion of the retentate is recirculated back to feed through recirculation line 16. Retentate and permeate exit the system through retentate 4 and permeate outlets 13. In an alternative configuration (not shown), the recirculation pump can be in the retentate recirculation line 16.

The systems and methods described herein with regard to SPTFF are applicable to TFF systems and methods.

Methods of the Invention Employing Diafiltration

In some embodiments, the methods described herein further comprise performing diafiltration (e.g., to remove or lower the concentration of salts or solvents in the liquid feed, or to accomplish buffer exchange). In a preferred embodiment, the diafiltration is performed by concentrating the liquid feed (e.g., by SPTFF or TFF) to reduce the diafiltration volume and then restoring the feed to its starting volume by adding diafiltration solution (e.g., diafiltration buffer), a process which is known in the art as discontinuous, or batch, diafiltration. In another embodiment, diafiltration is performed by adding the diafiltrate solution to retentate to increase the diafiltration volume followed by concentrating the sample to restore it to its original volume. In yet another embodiment, the diafiltration is performed by adding the diafiltration solution to unfiltered feed at the same rate that permeate is removed from the SPTFF or TFF system, a process which is known in the art as continuous, or constant-volume, diafiltration. Continuous countercurrent diafiltration can be performed with the TFF systems and methods of the invention. Suitable diafiltration solutions are well known and include, for example, water and various aqueous buffer solutions.

To perform diafiltration, the TFF system can include a reservoir or container for diafiltration solution and one or more conduits for carrying diafiltration solution from the diafiltration solution container to the liquid feed tank.

To avoid extremes of concentration and in-line dilution as part of the diafiltration process (e.g. >90%), it is preferred to inject the diafiltrate into multiple sections of the filtration assembly to restore the flow in the retentate section to the same flow as in the initial feed. This requires matching the rate of diafiltrate buffer addition with the rate of permeate removal. A preferred method is to use a single pump with multiple pump heads containing the diafiltrate addition and permeate removal flow lines (e.g. peristaltic pump from Ismatec (Glattbrugg, Switzerland)). Each pump head will have closely-matched pumping rates so this process will be balanced and maintain efficient buffer exchange. It is recommended to match flows for each of the multiple sections by using pumps containing up to 24 channels. The diafiltrate can be injected into the retentate ports in manifolds or separator plates.

The relevant teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A method of filtering a liquid feed, comprising:
    a) passing a liquid feed through a single pass tangential flow filtration (SPTFF) system that comprises:
        a plurality of stacked filtration modules that are fluidly connected, each filtration module comprising:
            a single manifold segment comprising a first manifold for receiving and carrying the feed into the filtration module, a second manifold for receiving and carrying retentate out of the filtration module, and a third manifold for receiving and carrying permeate through the filtration module; and
            one or more TFF capsules that are positioned on one or both faces of, and are fluidly connected to, the manifold segment,
            wherein the manifold segments are stacked and the manifolds in the manifold segments are coupled to create a centralized serial flow path through the system for feed and retentate;
        a feed inlet on the first filtration module in the system; and
        a retentate outlet on the last filtration module in the system,
        the SPTFF system having a liquid flow path that is parallel into the capsules in each filtration module and serial through the manifold segments in adjacent filtration modules by coupling the first manifold in each manifold segment to the second manifold of an adjacent manifold segment, such that the retentate of one module serves as the feed for the manifold segment of the next filtration module, except that the first manifold in the manifold segment of the first filtration module in the system is connected to the feed inlet and the second manifold in the manifold segment of the last filtration module in the system is connected to the retentate outlet; and
    b) recovering the retentate and permeate from the system in separate containers without recirculation through the SPTFF system,
    thereby filtering the liquid feed.

2. The method of claim 1, wherein the first and second manifolds in the manifold segment contain a seal or a valve.

3. The method of claim 1, wherein the filtration area for each filtration module is about 20 m² or less.

4. The method of claim 3, wherein the filtration area for each filtration module is about 10 m², about 1 m² or about 0.1 m².

5. The method of claim 1, further comprising a diafiltration step, wherein the diafiltration step includes concentration and dilution steps.

6. The method of claim 1, wherein the SPTFF system further comprises a diafiltration solution reservoir for diafiltration solution and a conduit for delivering diafiltration solution to a feed reservoir.

7. The method of claim 1, wherein the SPTFF system further comprises one or more of: sampling port, a T-line for in-line buffer addition, a pressure sensor, and a diaphragm for a pressure sensor.

8. The method of claim 1, wherein the SPTFF system lacks diverter plates.

9. The method of claim 1, wherein SPTFF system includes a diafiltrate solution pump having multiple pump heads, each containing diafiltrate solution addition and permeate removal flow lines.

10. The method of claim 1, wherein the manifolds in the single manifold segment have the same diameter throughout the filtration system or the manifolds in the single manifold segment have progressively smaller diameters from single manifold segment to single manifold segment.

11. A method of filtering a liquid feed, comprising:
    a) passing a liquid feed through a tangential flow filtration (TFF) system that comprises:
        a plurality of stacked filtration modules that are fluidly connected, each filtration module comprising:
            a single manifold segment comprising a first manifold for receiving and carrying the feed into the filtration module, a second manifold for receiving and carrying retentate out of the filtration module, and a third manifold for receiving and carrying permeate through the filtration module; and
            one or more TFF capsules that are positioned on one or both faces of, and are fluidly connected to, the manifold segment,
            wherein the manifold segments are stacked and the manifolds in the manifold segments are coupled to create a centralized serial flow path through the system for feed and retentate;
        a feed inlet on the first filtration module in the system;
        a retentate outlet on the last filtration module in the system;
        a recirculation loop for recirculating retentate through all or part of the system; and
        at least one conduit for recirculating retentate;
        the TFF system having a liquid flow path that is parallel into the capsules in each filtration module and serial through the manifold segments in adjacent filtration modules by coupling the first manifold in each manifold segment to the second manifold of an adjacent manifold segment, such that the retentate of one module serves as the feed for the manifold segment of the next filtration module, except that the first manifold in the manifold segment of the first filtration module in the system is connected to the feed inlet and the second manifold in the manifold segment of the last filtration module in the system is connected to the retentate outlet; and
    b) recovering permeate in a permeate container and a portion of the retentate from the system in a retentate container without recirculation through the TFF system; and
    c) recirculating the remainder of the retentate through all or part of the TFF system at least once, thereby filtering the liquid feed.

12. The method of claim 11, wherein about 10% or less of the retentate is recirculated after the first pass through the TFF system.

13. The method of claim 11, wherein the TFF system includes a valve or flow meter that is positioned on the retentate outlet or conduit carrying retentate from the system to the retentate container to control the amount of retentate that is recirculated.

14. The method of claim 11, wherein retentate is recirculated back to a feed container in the TFF system or back to a feed line after a feed pump in the TFF system.

15. The method of claim 11, wherein the first and second manifolds in the manifold segment contain a seal or a valve.

16. The method of claim 11, wherein the filtration area for each filtration module is about 20 m² or less.

17. The method of claim 16, wherein the filtration area for each filtration module is about 10 m², about 1 m² or about 0.1 m².

18. The method of claim 11, further comprising adding a diafiltration step, wherein the diafiltration step includes concentration and dilution steps.

19. The method of claim 11, wherein the TFF system further comprises one or more of: sampling port, a T-line for in-line buffer addition, a pressure sensor, a diaphragm for a pressure sensor, a reservoir for diafiltration solution, and a conduit for delivering diafiltration to a feed reservoir.

20. The method of claim 11, wherein the TFF system lacks diverter plates.

21. The method of claim 11, wherein the filtration modules can have the same or different filtration areas from each other.

22. The method of claim 1, wherein the last filtration module in the SPTFF system includes at least two TFF capsules having a diverter plate between adjacent TFF capsules to create a liquid flow path that is serial through the at least two TFF capsules.

* * * * *